United States Patent [19]
Dickson

[11] 3,732,697
[45] May 15, 1973

[54] WASTE DISPOSAL METHOD AND FACILITY

[76] Inventor: Rufus F. Dickson, 525 Arbolado Drive, Fullerton, Calif. 92653

[22] Filed: Jan. 14, 1972

[21] Appl. No.: 217,737

Related U.S. Application Data

[63] Continuation-in-part of Ser. No. 120,498, March 3, 1971, abandoned.

[52] U.S. Cl. ................................................. 61/35
[51] Int. Cl. .............................................. E02d 15/00
[58] Field of Search ....................... 61/35, 36, 7, 11; 210/170, 92, 93

[56] References Cited

UNITED STATES PATENTS

| | | | |
|---|---|---|---|
| 3,511,056 | 5/1970 | Jones et al. | 61/35 |
| 1,559,406 | 10/1925 | Carson | 61/7 X |
| 2,818,682 | 1/1958 | Finn | 61/35 X |
| 2,884,131 | 4/1959 | Mocarski | 210/93 |
| 3,552,130 | 1/1971 | Landau | 61/35 |
| 3,586,624 | 6/1971 | Larson | 61/35 X |

Primary Examiner—David J. Williamowsky
Assistant Examiner—Phillip C. Kannan
Attorney—Vernon D. Beehler et al.

[57] ABSTRACT

The present invention relates to a waste disposal method and to a waste disposal facility.

11 Claims, 9 Drawing Figures

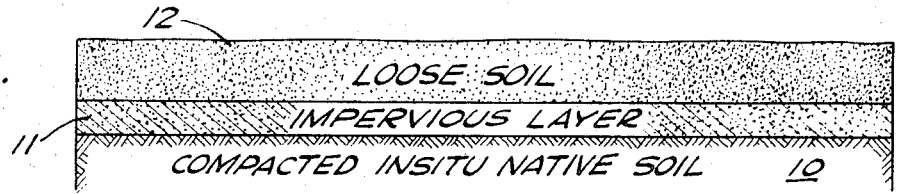
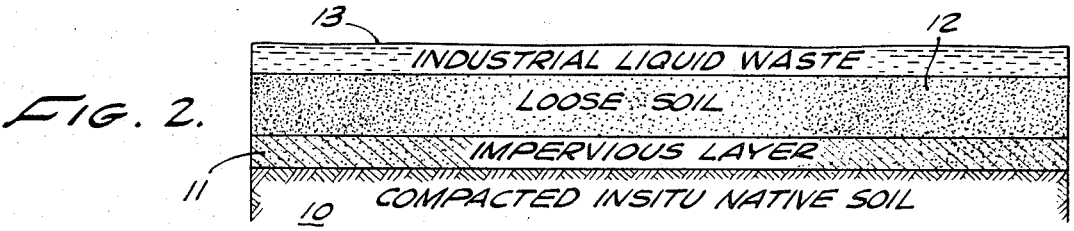
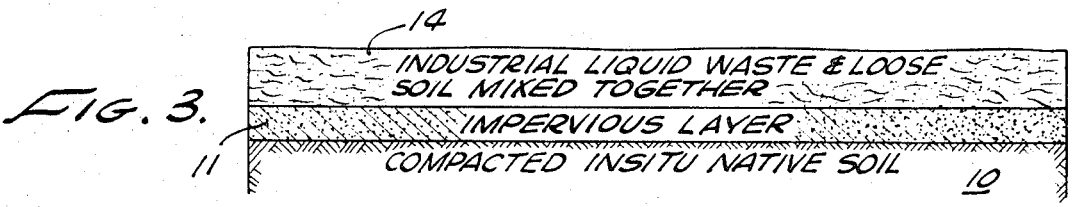
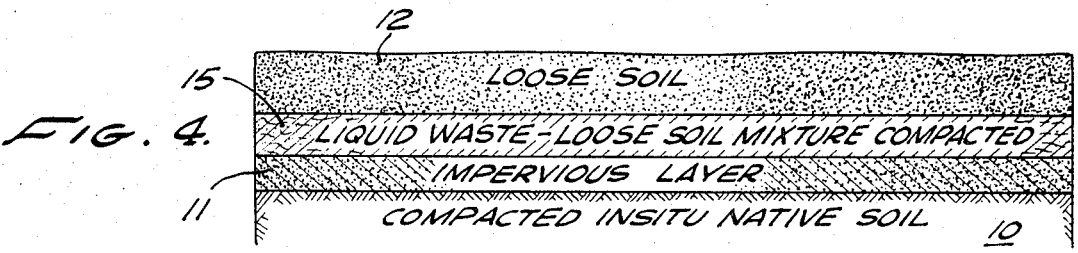
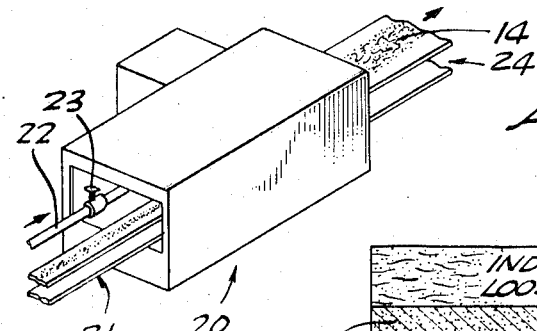
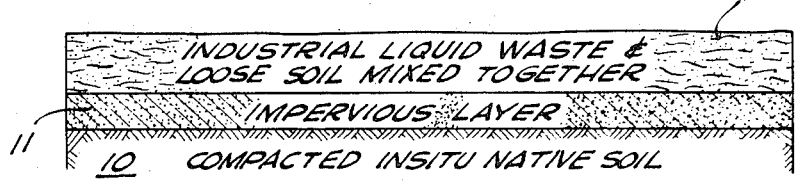
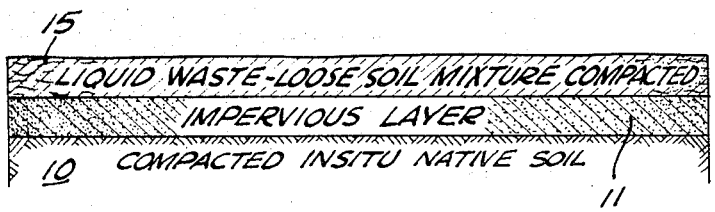

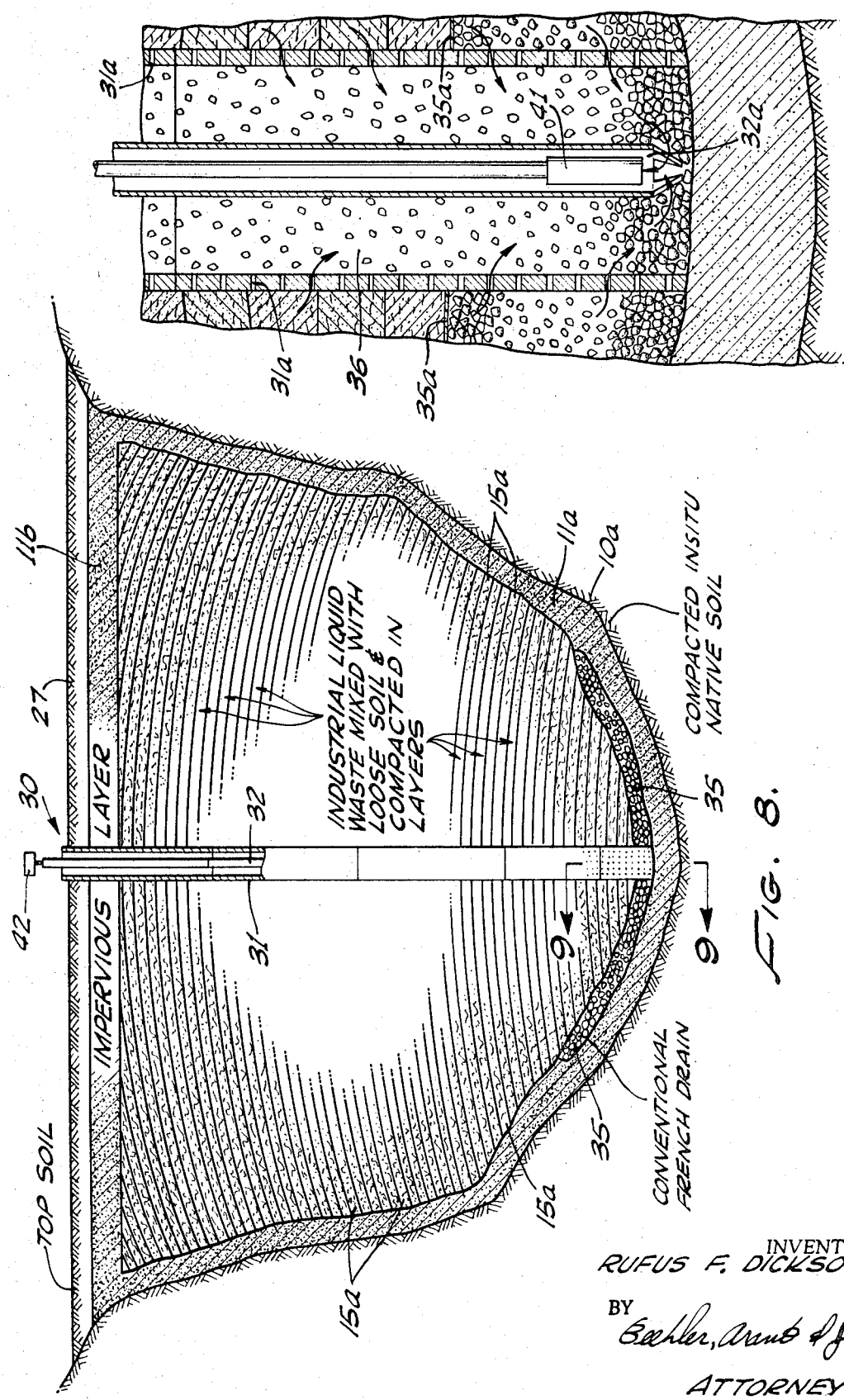

WASTE DISPOSAL METHOD AND FACILITY

REFERENCE TO COPENDING APPLICATION

The present application is a continuous-in-part of copending application Ser. No. 120,498, filed Mar. 3, 1971 and now abandoned.

According to one aspect of the invention, a waste disposal site is covered with a water-impervious barrier or liner, in order to prevent chemical contamination of underground water supplies beneath the site. The liner is constructed from a soil which, when mixed with water to approximately the optimum moisture content and then compacted, exhibits a permeability to water of less than approximately 1 foot per year.

According to a second aspect of the invention, liquid waste material is mixed with loose earth in a sufficient quantity to absorb the liquid; then the mix is spread upon the disposal site surface and is mechanically compacted.

According to a third aspect of the invention a waste disposal facility is provided with an impervious liner having a vessel-shaped configuration; waste material including a substantial quantity of liquid is then dumped within the vessel; and a dry test well constructed within the vessel provides a means for detecting the presence of liquid within the vessel and for determining the level of any undesired liquid above the surface of the liner.

BACKGROUND OF THE INVENTION

In large metropolitan areas the disposal of trash, garbage, and other waste has become a critical problem. A particularly difficult part of the overall problem is the satisfactory disposal of large quantities of industrial liquid waste. In general, the objective is to dispose of the waste materials without ecologically disturbing the surrounding or underlying soil areas, polluting surface streams, or contaminating underground water supplies.

The primary object and purpose of this invention is to provide a method for disposing of industrial liquid waste in such manner as will minimize, and preferably eliminate entirely, any contamination or ecological disturbance of the surroundings.

SUMMARY OF THE INVENTION

According to a first aspect of the invention, a waste disposal facility is constructed by placing an artificial liner over the native soil, the liner being water impervious and having a vessel-shaped configuration. The purpose of the liner is to permit various industrial liquid wastes to be dumped within the liner and yet be prevented from contaminating the underlying and surrounding soil structures and water supplies. The liner itself is constructed from sandy clay soil which is usually at or near the disposal site and which is mixed with water and then mechanically compacted to provide the desired water-impervious characteristic. The materials and procedures used in constructing the liner and the configuration of the liner are selected in such manner that the finished liner is not entirely rigid but has considerable flexibility and hence will not be readily cracked or fractured by ordinary stresses and strains or even by an earthquake and will generally heal itself of any tears that may occur.

According to a second phase of the invention, liquid waste material is prepared for disposal by mixing it with loose earth, the ratio of loose earth to liquid waste being sufficient so that the earth absorbs the liquid completely, and the earth is approximately at its optimum moisture content which thereby prevents uncontrolled flow of the liquid. The resulting mix is then spread on the surface of a disposal site and is compacted by mechanical means. As the disposal process continues, additional quantities of liquid waste material are mixed with loose earth, spread on the disposal site in successive interlocked layers with each layer being mechanically compacted at optimum moisture with properly weighted rollers before the next layer is spread on the site.

According to a third aspect of the invention, a disposal facility is prepared by creating sloping walls in the natural soil surface, then installing the artificial liner as referred to above, and thus providing a vessel-shaped liner. Industrial liquid waste may then be disposed of within the vessel. In the preferred form of this type of disposal facility, a dry test well is also constructed, including means for indicating the presence of undesired liquid in the bottom portion of the vessel above the liner surface. The test well provides a means for pumping undesired liquid out of the disposal facility should any appear in the dry test well. Any liquid pumped out of a dry test well would preferably be admixed with soil and compacted into a layer just as if it were waste liquid from an outside source.

DRAWING SUMMARY

FIG. 1 is a vertical cross-sectional view of a disposal site having an artificial liner prepared by mechanically compacting soil at approximately its optimum moisture content to a predetermined degree of impermeability in accordance with the invention;

FIGS. 2, 3, and 4 show the successive steps in spreading, mixing, and compacting a mixture of industrial liquid waste and loose soil on the site;

FIG. 5 is a perspective view of a mill used for mixing a predetermined ratio of industrial liquid waste to loose soil preparatory to disposal;

FIGS. 6 and 7 show the succeeding steps of spreading on the site and mechanically compacting the mix prepared by the mill of FIG. 5;

FIG. 8 is a vertical cross-sectional view of a canyon type of disposal site equipped with a liner and a dry test well; and FIG. 9 is a cross-sectional view taken on the line 9—9 of FIG. 8 and showing details of the dry test well.

PREPARATION OF LINER

According to a first aspect of the invention, an artificial liner is constructed upon the natural surface of a disposal site to serve as a water-impervious barrier. The liner is constructed from sandy clay soil which may be readily available at or near the disposal site, or the sand and clay components may be found separately and mixed together in the desired ratio. The soil materials used for the liner may also be a sand-clay-gravel mixture, such as, for example, GC, SC, CL, CH or OH Unified Soil Classification. Whatever the particular classification, the soil materials are selected and mechanically and physically tested for particle size and shape and inherent densification and permeability characteristics. Mixtures of soil materials are also useful and are sometimes preferred where very impermeable layers result from their use. Water is then mixed with this prepared soil material in a predetermined ratio in order to provide the material for the liner.

In preparing the liner the soil material may first be spread on the site and the water spread on top, or alternatively the soil materials and water may both be supplied to a continuous mix, pug-mill type mixer, such as shown in FIG. 5. If a mill is used, the mixed material is then conveyed to and spread upon the surface of the site. Conventional machines are then used for compacting the resulting mixture so as to produce a water-impervious layer which covers the entire surface of the disposal site.

The important purpose of the liner is to prevent liquid waste material reposing above the liner, and particularly waste material of an active chemical nature, from contaminating adjacent underground water supplies. In order to avoid having the liner itself act as a source of contamination, it is necessary that the water used in preparing the liner be only potable water.

In preparing the liner the material is compacted to such a degree that the liner is at approximately the plastic limit so that it can be deformed by deflection or even sheared or torn by actual movement, such as movement resulting from an earthquake, and still it will not lose its effectiveness due to the fact that the weight of multiple layers of compacted waste materials normally resting above it will completely heal the tear or fracture. This is particularly true because the waste materials resting above the liner will, according to the present invention, have a certain moisture content.

METHOD OF FIGS. 1 TO 4

Referring now to FIGS. 1 to 4 of the drawings, the in situ native soil is identified by the numeral 10. According to the present invention, it is preferred to compact the in situ native soil by mechanical means to a depth sufficient to cover the largest gravel on the site. The liner 11 is installed thereafter on the prepared base of the native soil.

The liner 11 shown in FIGS. 1 to 4, inclusive, is prepared by selecting a site and grading and compacting the in situ native soil to provide a base for the liner. The in situ native soil base is prepared so that there are no rocks projecting above the surface of the prepared base. A soil is selected for the impervious liner 11, such that upon compaction at optimum density it will have a moisture impermeability of less than about 1 foot per year. The liner is in all at least 8 feet thick and preferably at least 10 feet thick. The liner is prepared by building up successive layers of compacted soil. Each layer is prepared by admixing a predetermined percentage of potable water with the preselected soil. The soil is compacted to optimum density with conventional equipment, preferably sheepsfoot roller, properly weighted in relation to the thickness of the soil layer. In general, the layers are from approximately 6 inches to 1 foot in thickness. As the compaction of each layer is completed, the surface of that layer is not smoothed but is left with the deep imprints of the sheepsfoot roller so that the next succeeding layer will be bound or interlocked to the previous layer. This avoids the formation of horizontal planes or layers which might become paths for percolation and eventual piping of the moisture through the impervious layer.

The individual layers in the liner are compacted very carefully to as much as 95 percent compaction so as to insure that there will be substantially no flow of moisture through this liner even over a period of several years. The waste liquid soil layers are preferably compacted to a bearing value equal to or greater than the bearing value of the original soil. The degree of compaction of the waste liquid soil layers need not be as great as that of the liner so long as they are substantially impervious to moisture so as to prevent the flow of liquid through and between the waste containing layers.

When a sufficient number of lifts or layers of soil and potable water have been compacted to form a liner approximately 10 feet thick, the potable water is replaced with the liquid wastes and succeeding layers of soil admixed with liquid wastes are spread upon one another and compacted to approximately optimum density. The disposal site is essentially dry with no liquid migrating through the compacted layers.

While the advantages derived from the liner are greater where the liner has a vessel-shaped configuration, nevertheless the liner may be used in a perfectly flat configuration as shown, and benefits are still derived therefrom in accordance with the invention.

According to the form of the method illustrated in FIGS. 1 to 4, the liquid waste material is prepared for disposal by first spreading a layer of loose earth 12 upon the disposal site. A layer of liquid waste, such as industrial liquid waste 13, is then spread upon the soil layer 12, as shown in FIG. 2. Thereafter, the loose soil 12 and liquid waste 13 are mixed by conventionally available machinery, such as a road grader equipped with a mixing blade, which traverses the surface of the disposal site. The resulting mixture 14 is shown in FIG. 3. The resulting mixture is proportioned so that upon compaction to optimum density the resultant layer is substantially impervious to moisture.

The next step is to compact the layer 14 of mixed material to optimum density so as to reduce it to a much lesser thickness and increase its mechanical rigidity and stability. The resulting compacted mixed layer 15 is shown in FIG. 4. The compaction process may conveniently be accomplished by use of conventional machinery available for that purpose, as, for example: sheepsfoot roller, vibratory compactor, pneumatic roller, tandem roller, or three-leg roller. The grade at the disposal site, type of soil, viscosity of liquid waste and of the resulting mixture, will determine the type of compaction equipment used.

In carrying out this process the quantity of liquid waste 13 that is spread upon the surface of the loose earth 12 is carefully controlled and restricted so as to keep it within the amount that the loose earth material is capable of absorbing. If perchance too large a quantity of liquid is used, then additional loose earth is spread on top before the completion of the mixing process. The layer of mixed material 14, as shown in FIG. 3, is of such consistency that it can be handled by a machine traversing the surface of the disposal site, and yet thick enough so that no uncontrolled liquid flow arises.

The step of compacting the mixture necessarily results in diminishing the thickness of the layer of mixed materials 14. Typically each lift or layer 14, prior to compaction, is about 6 inches to about 12 inches thick. After compaction, the thickness of the layer will be reduced to about two-thirds to five-sixths of its original value. However, the amount of reduction of thickness of the mixed layer is not important in and of itself. The upper surface of each layer is not smoothed before the next layer is applied. This allows each layer to bind or weld to the layer below. Preferably a sheepsfoot roller is used to compact the layers and each succeeding layer is bound to the one below through the impressions made by this roller.

According to one application of the invention, a canyon or other depression may be filled in by use of the novel method just described, resulting in an elevated site available for construction purposes. Where that end is desired, it becomes necessary to insure that each layer of the fill meets a minimum standard of compaction or density. Assuming that an optimum amount of compaction or density is rated at 100 percent according to a standard test used for this purpose, the layers of lifts 15 provided in accordance with the invention may be compacted to 80 percent, 85 percent, or perhaps more, and will then provide a perfectly satisfactory structural base for the superimposed layers or lifts as well as for whatever structures are to be placed at the elevated location. Thus, the real criteria for compaction of the mix is not the reduction in thickness of the layer, but whether a desired degree of compaction has been achieved for purpose of the structure that is to be superimposed and the degree of impermeability that is to be achieved. Preferably, the permeability of the waste-containing layers is approximately the same as that of the liner so that there is no liquid moving through or between the layers. The permeability of the waste-containing layers may be somewhat greater than that of liner, if desired.

As indicated in FIG. 4, after one of the mixed layers 14 has been compacted to form the compact layer 15, a layer of loose soil 12 is then spread on top. The process is then continued with an additional layer of liquid waste 13, the mixing of the loose soil 12 and liquid waste 13 to provide a layer of mixed material 14, and the mechanical compacting of the layer 14 to provide another compact layer 15. Additional layers of compacted mix are then added as desired, raising the structure to any desired elevation.

In some instances the liquid material being disposed of may be the bottoms of residue of an oil refining process, which will be largely asphaltic in nature. This type of material is characterized by being repellant to water. Alternatively, the liquid material may be the residue of an oil refining process, which has a paraffin base, and is also repellant to water. When utilizing this type of material, a proper control of the ratio of the liquid waste material to the loose earth and of the degree of mechanical compaction of the mix make it possible to achieve a compacted layer which is substantially water impervious. Preferably, however, the liquid waste is treated to render it water soluble, for example, by emulsification, so that the characteristics of the individual layers are generally similar.

METHOD OF FIGS. 5 TO 7

According to another method of carrying out the invention, the liquid waste and loose soil are not mixed together directly upon the surface of the disposal site, but are instead mixed in a mill which is positioned immediately adjacent to the disposal site. Thus, FIG. 5 illustrates a pug-mill 20 having an infeed conveyor 21 for supplying loose earth thereto and a pipeline 22 for conveying liquid waste material. The rate of flow of liquid in the pipeline 22 is controlled by a valve 23. The output of the mill 20 is the mix 14 which is carried on a conveyor 24 to the disposal site surface.

Thus, as shown in FIG. 5 the mix 14 is spread directly on the surface of the liner 11. Thereafter, the mix is compacted mechanically by means of a conventional machine which traverses the surface of the site, as previously described. The resulting compacted mix 15 is the same as the resulting structure achieved by the method of FIGS. 1 to 4. There may, of course, be some difference in the quality of mix that is achieved.

The use of a mill installation, as shown in FIG. 5, is particularly advantageous if the disposal site has a very large capacity, because the use of the mixing mill then provides a cost saving which is significant.

EMBODIMENT OF FIGURES 8 AND 9

The impervious liner 11 of the present invention may be advantageously employed in a vessel-shaped configuration, one form of which is illustrated in FIG. 8. Ordinarily this type of structure is utilized in a natural canyon, where the vessel-shaped configuration of the liner 11 follows the natural configuration of the canyon wall. However, there are instances where it may be advantageous to modify the shape of the natural terrain, or by other means provide a vessel-shaped configuration for the water-impervious liner.

The impervious liner 11a is prepared on the generally horizontal portion of the compacted in situ native soil 10a, according to the procedure described above with reference to FIGS. 1 through 4. As the impervious layer reaches the steep sides of the canyon wall, the thickness of the liner is constructed with its upper surface being substantially horizontal. At this stage in its construction the liner resembles a road of about 10 feet in width, extending around the periphery of the canyon. Preferably, the liner is constructed at a rate such that the horizontal upper surface of the liner is approximately 10 feet above the surface of the waste liquid-soil layers 15a. In this way it is possible to use the upper horizontal surface of the liner as a roadway upon which to maneuver equipment used in the construction of the compacted layers 15a. The horizontal upper surface of the liner 11a is moved upwardly as required to keep it approximately several feet above the level of the compacted layers 15a by adding 6- to 12-inch thick lifts of potable water and soil and compacting them at optimum density, as previously described with reference to the construction liner 11 in FIGS. 1 to 4.

In FIG. 8 the natural soil is indicated by numeral 10a and the liner by numeral 11a, the modified reference numeral being employed to indicate the vessel-shaped configuration which is different from that shown in the previous drawing figures. Within the vessel provided by liner 11a is shown a vertical structure consisting of successive compacted layers 15a, each compacted layer 15a being formed of a mixture of liquid waste material and loose soil, as previously described, the mixture being compacted by mechanical means. The modified reference numeral 15a is employed to indicate the modified configuration of the layer. As shown in FIG. 8, the successive layers of compacted liquid waste-loose soil mixture are crowned toward the center of the disposal site on a slope, which approaches but is not greater than 4 to 1. The crowned construction is useful in maintaining pressure on the outside walls of the liner 11a, thus decreasing the permeability of the liner and improving its capacity to heal itself should it be torn by an earthquake.

In the preferred from of installation as shown in FIG. 8, the top of the compacted layers 15a is covered by another impervious layer of liner 11b, which thus seals the interior of the disposal site from the surrounding terrain. Liner 11b is prepared using potable water and is preferably at least 10 feet thick. A layer of top soil 27 is placed above the liner 11b, thus permitting the new and elevated surface location to be utilized for building constructions, recreational areas, or such other purpose as may be desired.

Another feature of the disposal facility as shown in FIGS. 8 and 9 is the test well 30. The well point is shown in FIG. 9. The well 30 includes an outer casing 31 and an inner casing 32. The pipe or casing is typically in 10-foot sections which are installed one section at a time as the construction of the disposal facility progresses in the upward direction.

The function of the well point is to permit any liquid existing at the lowermost level of the disposal site, above the surface of the bottom central portion of liner 11a, to flow into the lower end of the exterior well casing 31 where its presence can be detected and from which it can be withdrawn as soon as it appears. A number of conventional French drains 35 are provided for feeding liquid to the well point, each of these drains being formed by a groove or ditch that is cut in the surface of the liner 11a and arranged radially relative to the well 30. Each groove or ditch is filled with gravel which is then covered with a layer of tar paper 35a. The lowermost end of the exterior casing 31 is provided with numerous perforations 31a through which liquid may enter. The interior of the lower portion of the exterior casing 31 is occupied by coarse gravel 36, filling the space between the inner casing 32 and the outer casing 31.

The inner casing 32 is open at its lower end 32a, as shown in FIG. 9, in order to permit the entry of any liquid that is present. A measuring device 41 is located within the lower end of the inner casing 32 and is coupled to a gage or indicating device 42 located in a visible position at the top of the wall 30, the measuring device 41 serving to measure either liquid level or liquid pressure at its location and the indicating device 42 serving to indicate accordingly.

The construction of test well 30 may also be so arranged that the measuring device 41 serves as either the input or output for a pumping loop. The pumping loop may be operated from time to time, when and as required, in order to remove any liquid which accumulates in the well point area. While only a single test well has been illustrated, it will of course by understood that depending upon the size of the disposal site it may be desirable to utilize two, three, or more separate test well locations.

Thus, in accordance with the preferred form of the invention, as shown in FIGS. 8 and 9, the accumulation of free-flowing liquid within the vessel that is provided by the liner 11a may be prevented. Preventing the accumulation of liquid is of considerable importance because if liquid were permitted to accumulate in substantial quantities there would be a build up of pressure on the interior wall of the liner 11a, which in turn would pose a threat to the mechanical integrity of the liner.

The term "liquid" or "liquid waste" is used generally to include colloids, suspensions, slurries, solutions, and the like, wherein the dominant phase is liquid. The liquid waste layers will, upon proper compaction, tolerate the presence of some solid waste material without creating a situation in which liquids can migrate through the layers.

The compaction of the 6- to 12-inch lifts or layers is preferably accomplished using a sheepsfoot roller which is properly weighted in proportion to the thickness of the layer. In general, the unit pressure on a 6- to 12-square inch foot should be in excess of 250 pounds per square inch, and in certain types of soils unit pressures as high as 650 pounds per square inch may be required to obtain the required density. By keeping the thickness of the layer to be compacted to not more than approximately 12 inches, a 30,000-pound sheepsfoot roller will generally produce the desired degree of compaction.

When the soil and liquid waste are admixed in a mill and conveyed to the point at which the compacted layer is being formed, the mixing is conveniently accomplished using a continuous mix, pug-mill type mixer. Pug-mill type mixers that are suitable for this use are generally of the same design as those that are used for mixing asphalt products. One convenient method of operation is to stockpile soil that is to be used in preparing the compacted layers. The stockpiled soil is conveyed by conveyor belt to a continuous mix, pug-mill type mixer. The resultant admixture is then conveyed from the mixer to the disposal site, where it is mechanically compacted into a layer having the desired characteristics of impermeability.

The selection of soil materials for use in the construction of the impervious liner and the liquid waste soil layers is made by testing the soil to determine whether it can be mechanically compacted to a state of substantial impermeability with an appropriate quantity of water. Also, tests are made to determine what is the appropriate quantity of water for admixture with a particular soil. At the optimum moisture content the voids in the soil are filled but not overfilled with water, and the water has not yet started to displace the soil. This is the point at which the soil will have the greatest dry weight per cubic foot. As the moisture content passes this point, the water starts to displace the soil which results in a decrease in the density of the soil-water admixture. When the amount of moisture is insufficient to fill all of the voids in the soil, the hollow spaces in the soil reduce its density. The optimum moisture content is the water content at which a soil can be compacted to the maximum dry unit weight by a given compactive effort. This determination is made by selecting a moisture content at the greatest dry unit weight exhibited on the curve produced by the Proctor Compaction Test (moisture-density relations of soil), Designation E-11, Bureau of Reclamation Earth Manual, First Edition, revised 1968. The compaction test is a laboratory procedure whereby a soil at a known moisture content is placed in a specified manner into a mold of given dimensions, subjected to a compactive effort of controlled magnitude and the resulting unit weight determined. The procedure is repeated for various water contents sufficient to establish a relation between water content and unit weight. The permeability of soil is determined by the Bureau of Reclamation Earth Manual, First Edition, revised 1968, Designation E-13.

When the terms "optimum density" or "optimum moisture content" are referred to herein, it is intended to describe that soil condition wherein the voids in the soil are substantially filled with water, but the water has not yet started to displace the soil. In general, all of the compacted layers in both the impervious liner and the waste liners are compacted at substantially optimum density. There is substantially no migration of liquid through the compacted soil. The liquid waste in the waste layers or the potable water in the liner just fill the voids in the hard dense compacted layer and remain there in suspension without odor or drainage of wastes through the fill. As the degree of compaction increases, the quantity of liquid required to substantially fill the voids in the soil decreases. The degree of compaction in the waste layers is preferably held to the minimum required to get the desired bearing value and degree of impermeability so that liquid will not flow through the layers and structures can be built on the layers without further compaction. The degree of compaction in the layers of the impervious liner is quite high so as to insure impermeability.

What is claimed is:

1. The method of preparing a disposal site to receive both solid and liquid waste material, comprising the steps of:
    selecting a quantity of sandy clay soil;
    preparing a substantially moisture-impervious, relatively flexible liner by spreading successive layers of the sandy clay soil admixed with potable water on the in situ native soil of the disposal site surface to provide a liner having a thickness of several feet; and
    mechanically compacting each of the successive layers of sandy clay soil at approximately its optimum density to provide a water-impervious barrier which will protect underground water supplies from chemical contamination by liquid waste materials which are dumped on top of the liner.

2. The method of claim 1 in which the in situ native soil is previously graded and compacted to provide a base for said liner.

3. A method of liquid waste disposal comprising the steps of:
    first lining the surface of a disposal site with successive layers of loose earth that is admixed with potable water and individually compacted to provide a relatively flexible, substantially water-impervious barrier several feet thick;
    admixing the liquid waste with a quantity of loose earth sufficient to substantially fill the voids in the earth with the liquid and spreading the resultant admixture on the surface of the disposal site above the liner; and
    then mechanically compacting the mix at about its optimum density.

4. The method of claim 3 wherein the liquid waste is an industrial chemical waste.

5. The method of claim 3 wherein successive layers of mixed liquid waste and loose earth are spread on the surface of the water-impervious barrier and are individually, mechanically compacted.

6. The method of claim 3 wherein both the liquid waste and the loose earth are fed into a mill which is stationed at the disposal site and which performs the admixing operation, the resultant admixture being conveyed from the mill to the location where it is spread on the surface of the water-impervious barrier.

7. The method of claim 3 wherein the compaction is accomplished using a sheepsfoot roller.

8. The method of claim 3 wherein the compaction is accomplished using a vibratory compactor.

9. The method of claim 3 wherein the water-impervious barrier is formed into a vessel-shaped configuration having side walls which are higher than its central bottom wall.

10. The method claimed in claim 5 wherein the successive layers of compacted liquid waste-loose earth mixture are crowned toward the center of the disposal site on a slope not greater than 4 to 1.

11. A waste disposal facility comprising:
    a natural soil disposal site having its surface arranged in essentially vessel-shaped configuration;
    a relatively flexible lining of sandy clay soil artificially placed on said site, being compacted at about its optimum density to provide a substantially water-impervious liner, and being arranged to form a vessel having side walls which are higher than its central bottom wall;
    a quantity of waste material retained within said vessel formed by said liner; and
    a dry test well having an opening within said body of waste material at a point above the surface of said central bottom wall of said liner and including means for providing test data indicating the presence and level of liquid at said point above the surface of said liner.

* * * * *